(12) United States Patent
Wu

(10) Patent No.: US 6,405,951 B1
(45) Date of Patent: Jun. 18, 2002

(54) ADJUSTMENT DEVICE OF A PEPPER GRINDING TOOL

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/611,445

(22) Filed: Jul. 6, 2000

(51) Int. Cl.⁷ .................................................. A47J 42/04
(52) U.S. Cl. ................................................... 241/169.1
(58) Field of Search ............................. 241/165, 169.1

(56) References Cited

U.S. PATENT DOCUMENTS

| 4,685,627 A | * | 8/1987 | Lee .......................... 241/169.1 |
| 5,180,114 A | * | 1/1993 | Chen ......................... 241/169.1 |

* cited by examiner

Primary Examiner—Mark Rosenbaum
(74) Attorney, Agent, or Firm—Rosenberg, Klein & Lee

(57) ABSTRACT

An adjustment member of a pepper grinding tool has a cap, an elastic member, an engaging hook and a support rod. The grinding tool has a main body, a grinding assembly, a turnable member and the adjustment member. The grinding assembly is received in the main body, and includes an inner and an outer grinding wheels. The inner wheel can be turned relative to the outer wheel to grind pepper. The adjustment member is fitted to a hole of the turnable member. The support rod is connected to the inner grinding wheel by a connecting rod. The elastic member is located between the support rod and the cap such that the cap is biased upwards by the elastic member. The engaging hook is connected to the cap at one end, and movably received in a trench of the support rod at other end. The cap can be moved between a projecting adjustment position and a hidden position; in the projecting position, the cap can be turned to adjust a position of the inner wheel; in the hidden position, the cap is depressed into the hole with the engaging lower part of the trench.

1 Claim, 6 Drawing Sheets

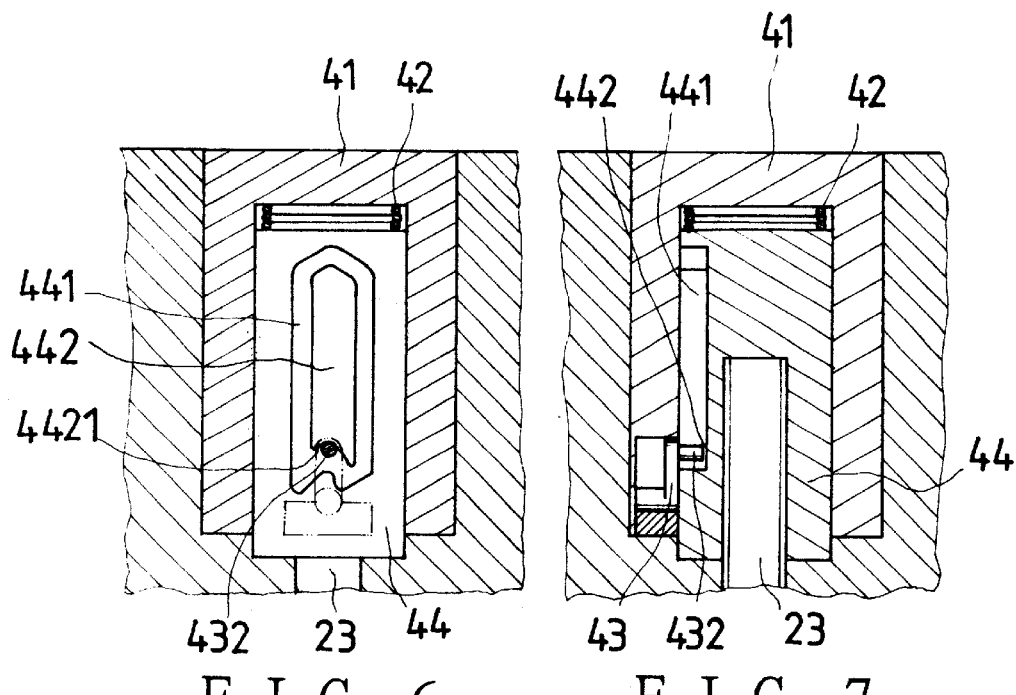
F I G. 6   F I G. 7
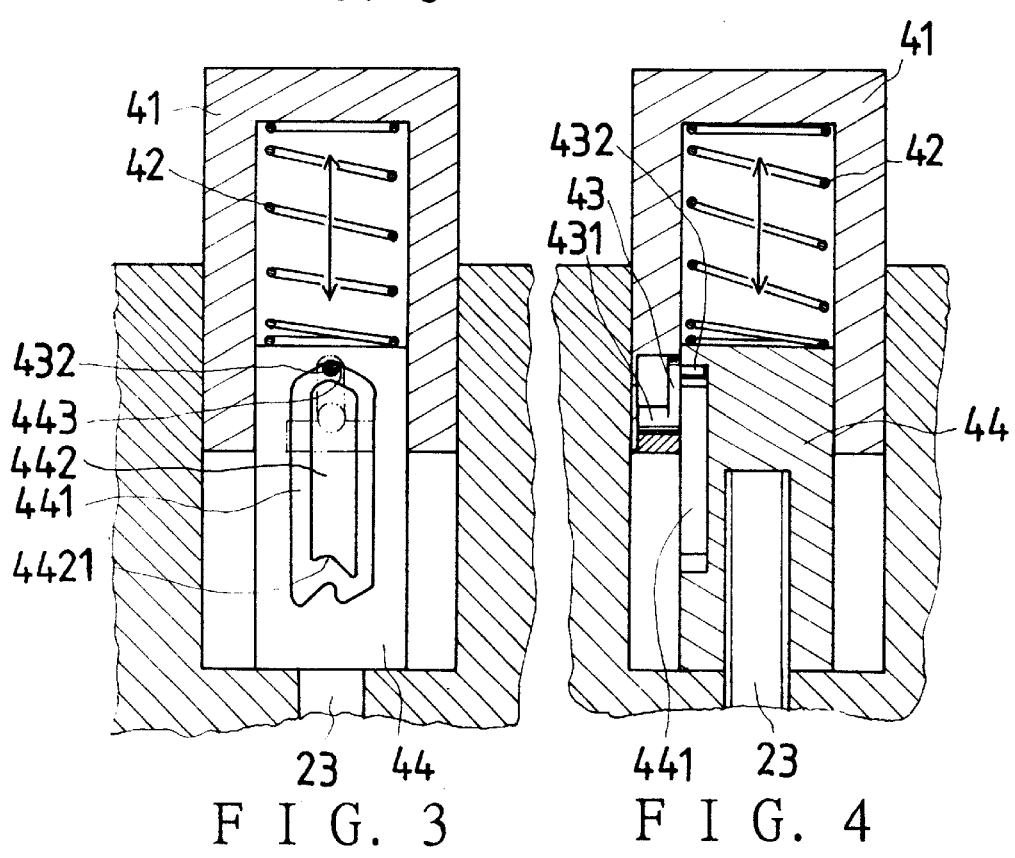
F I G. 3   F I G. 4

US 6,405,951 B1

ADJUSTMENT DEVICE OF A PEPPER GRINDING TOOL

BACKGROUND OF THE INVENTION

The present invention relates to an adjustment device of a pepper grinding tool for adjusting the degree of fineness of ground pepper from the grinding tool.

Referring to FIGS. 11 and 12, a conventional pepper grinding tool has a main body 10, a grinding assembly 20, a turnable member 30 and an adjustment knob 40.

The grinding assembly 20 consists of an inner grinding wheel 201 and an outer grinding wheel 202. The grinding wheels 201, 202 have toothed portions facing each other such that pepper can be ground therebetween when the inner grinding wheel 201 turns relative to the outer grinding wheel 202.

The turnable member 30 is turnably connected to an upper end portion of the main body 10. A connecting rod 203 is connected to the inner grinding wheel 201 from a lower end, and connected to the turnable member 30 from an upper end portion. The upper end portion of the connecting rod 203 projects on the turnable member 30, and has a threaded surface.

The adjustment knob 40 has a threaded hole 401. The threaded upper end portion of the connecting rod 203 is screwed into the threaded hole 401. Thus, the adjustment knob 40 can be turned to adjust the inner grinding wheel 201 in respect of the distance from the outer grinding wheel 202. When the inner grinding wheel 201 is adjusted to a suitable position, the turnable member 30 is turned to grind pepper between the grinding wheels 201, 202 into finer particulate, the connecting rod 203 and the inner grinding wheel 201 being turned together with the turnable member 30.

However, the adjustment knob 40 sticking out on the turnable member 30, will effect the appearance of the pepper grinding tool in a bad way.

Referring to FIGS. 13, 14, another conventional pepper grinding tool has a main body 10, a grinding assembly 20, a turnable member 30, a connecting rod 203 and an adjustment knob 40. The adjustment knob 40 is connected to the lower end portion of the connecting rod 203, and received in a recess 101 on a bottom of the main body 10.

To turn the adjustment knob 40 in order to adjust the inner grind wheel 201, the user has to insert his/her fingers into the recess 101. It is not very convenient for the user to turn the knob 40 in the recess 101.

SUMMARY OF THE INVENTION

Therefore, it is a main object of the present invention to provide an adjustment device for a pepper grinding tool which has an adjustment knob movable into the main body or the turnable member when not in use; thus, the adjustment knob won't effect the appearance of the pepper grinding tool in a bad way.

The pepper grinding tool of the present invention has:
a housing main body; the main body having a hole;
a grinding assembly; the grinding assembly including an inner, an outer grinding wheel and connecting rod; the grinding wheels having toothed portion facing each other for grinding pepper therebetween by turning the inner wheel; the connecting rod being connected to the inner wheel; the grinding assembly being received in the main body;
a turnable member; the turnable member being turnable fitted to the main body, and connected to the connecting rod for the user to turn to grind pepper,
an adjustment member; the adjustment member including a cap, an elastic member, an engaging hook and a support rod, the support rod being connected to the connecting rod, and received in the hole of the main body; the elastic member being received in the cap, and located on the top of the support rod such that the cap is biased upwards by the elastic member; the engaging hook being connected to the cap from one end, and having other end movably received in a trench of the support rod; whereby the cap can be moved between a projecting adjustment position and a hidden position; in the hidden position, the cap is depressed into the hole with the engaging hook fixed in a lower part of the trench; in the projecting position, the cap is biased upwards by the elastic member, and can be turned to adjust a position of the inner wheel relative to the outer wheel.

BRIEF DESCRIPTION OF THE DRAWINGS

The present invention will be better understood by reference to the accompanying drawings, wherein:

FIG. 3 is a fragmentary cross-sectional view of the pepper grinding tool in FIG. 2, with the cap being located in the projecting position.

FIG. 4 is another fragmentary cross-sectional view of the pepper grinding tool of the present invention, with the cap being located in the projecting position.

FIG. 6 is a fragmentary cross-sectional view of the pepper grinding tool in FIG. 2, with the cap of the adjustment member being located in the hidden position.

FIG. 7 is another fragmentary cross-sectional view of the grinding tool of the present invention with the cap being located in the hidden position.

DESCRIPTION OF THE PREFERRED EMBODIMENTS

Figure 5:
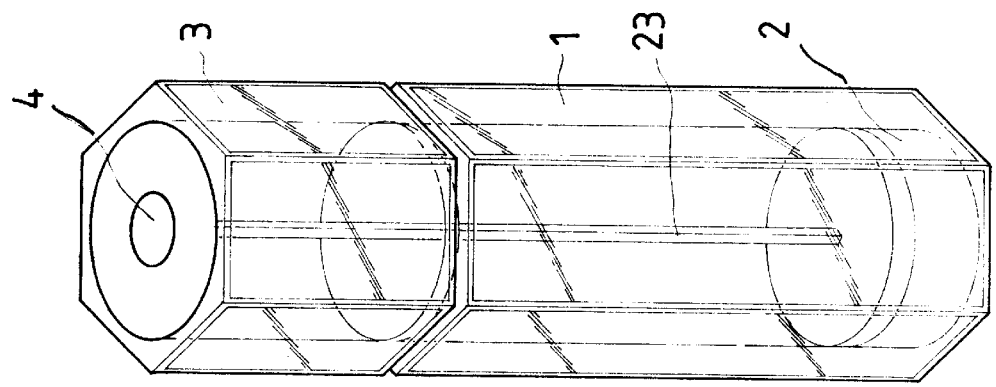
FIG. 5 is a view of the pepper grinding tool of the present invention with the cap of the adjustment member being located in the hidden position.
Figure 1:
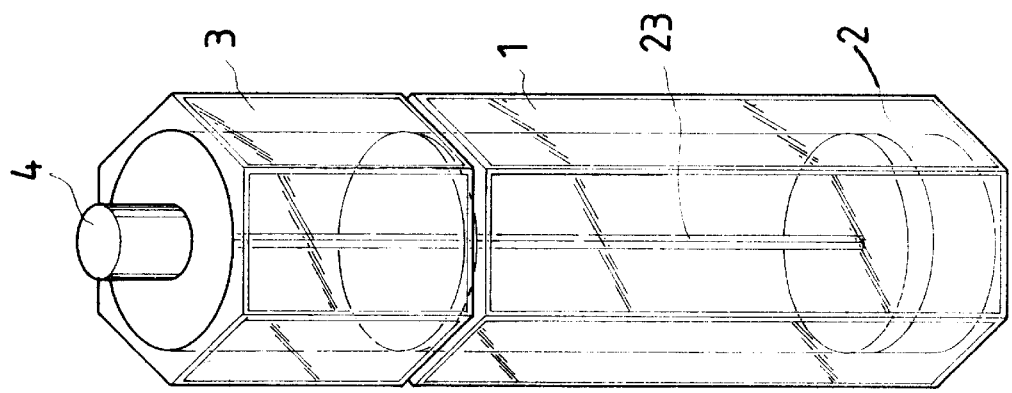
FIG. 1 is a view of the pepper grinding tool of the present invention with the cap of the adjustment member located in a projecting position.

Referring to FIGS. 1, 2, 3 and 4, a pepper grinding tool of the present invention has a main body 1, a grinding assembly 2, a turnable member 3 and an adjustment member 4.

The grinding assembly 2 has an inner grinding wheel 21, an outer grinding wheel 22 and a connecting rod 23. The grinding assembly 2 is received in the main body 1. The connecting rod 23 is connected to the inner grinding wheel 22 from a lower end. The grinding wheels 21, 22 have toothed portions facing each other such that pepper can be ground therebetween when the inner grinding wheel 21 is turned.

The turnable member 3 is turnably connected to an upper end of the main body 1. The turnable member 3 has a receiving hole 31 on an upper side. The connecting rod 23 is passed through the turnable member 3, and into the receiving hole 31 from a threaded upper end portion 231.

Figure 2:
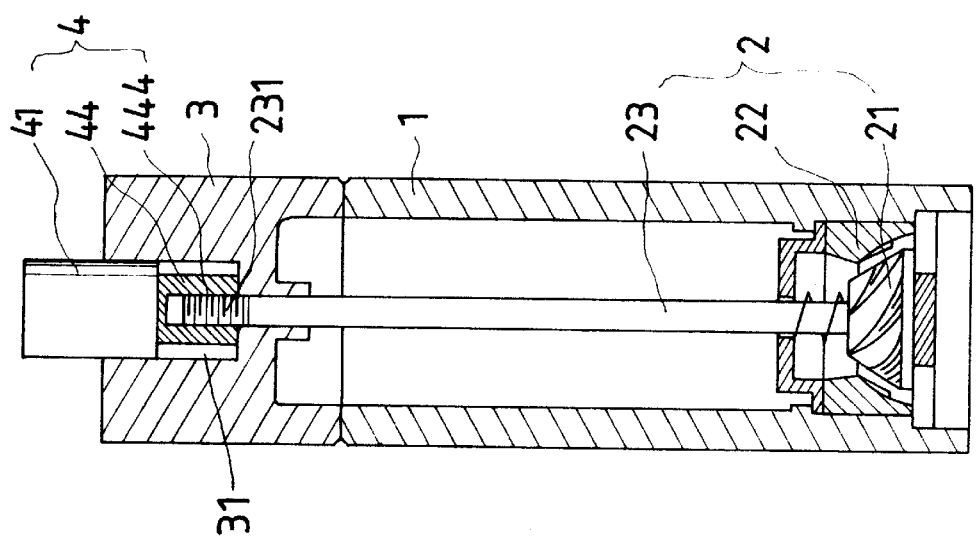
FIG. 2 is a cross-sectional view of the pepper grinding tool of the present invention with the cap of the adjustment member located in a projecting position.

Referring specifically to FIGS. 3 and 4, the adjustment member 4 has a cap 41, an elastic member 42, an engaging hook 43 and a support rod 44. The support rod 44 has a threaded hole 444, as shown in FIG. 2. The threaded upper end portion 231 of the connecting rod 23 is screwed into the threaded hole 444. The support rod 44 further has a bar-shape portion 442, a trench 441 around the bar-shape portion 442. The trench 441 has a stopping portion 443 on a top side. The bar-shape portion 442 has an engaging end 4421 on a lower end.

The engaging hook 43, as shown in FIG. 4, has a connecting part 431 and an engaging part 432. The connecting part 431 is connected to the cap 41. The engaging part 432 is received in the trench 441 of the support rod 44.

The cap 41 is movably disposed above the support rod 44 with the elastic member 42 received therein and supported by a top end of the support rod 44. Thus, the elastic member 42 biases the cap 41 upwardly. And, the cap 41 can be moved between an adjustment position and a hidden position. Referring to FIGS. 6 and 7, the cap 41 is depressed into the receiving hole 31 of the turnable member 3, and fixed in position with the engaging part 432 of the engaging hook 43 engaging the engaging lower end 4421; to move the cap 41 to the adjustment position, the cap is further depressed for the engaging part 432 to separate from the engaging lower end 4421. Thus, when the cap 41 is released, the cap 41 can be biased upwards by the elastic member 42. The cap 41 will be fixed in position with the engaging part 432 fixed under the stopping portion 443 of the trench 441; thus, the cap 41 can be turned to adjust the position of the inner grinding wheel 21 being capable of turning together with the cap 41.

When the inner grinding wheel 21 is adjusted to a desired position, the cap 41 is depressed to be located in the hidden position. Thus, pepper between the grinding wheels 21, 22 can be ground into particulate of suitable fineness by turning the turnable member 3.

Figure 9:
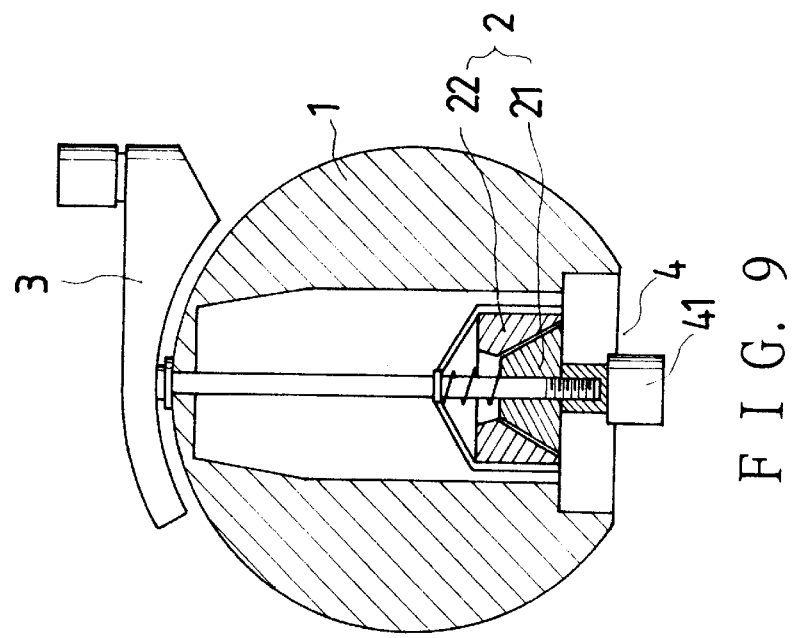
FIG. 9 is a cross-sectional view of the grinding tool in FIG. 8.
Figure 10:
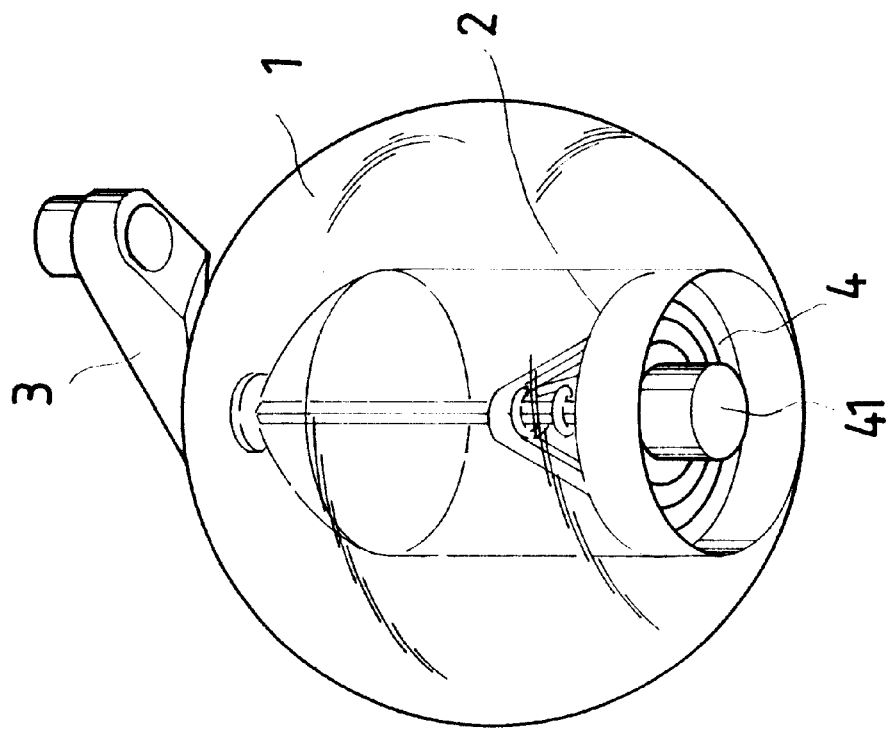
FIG. 10 is a perspective view of the second embodiment of the present invention, with the cap being located in the hidden position.
Figure 8:
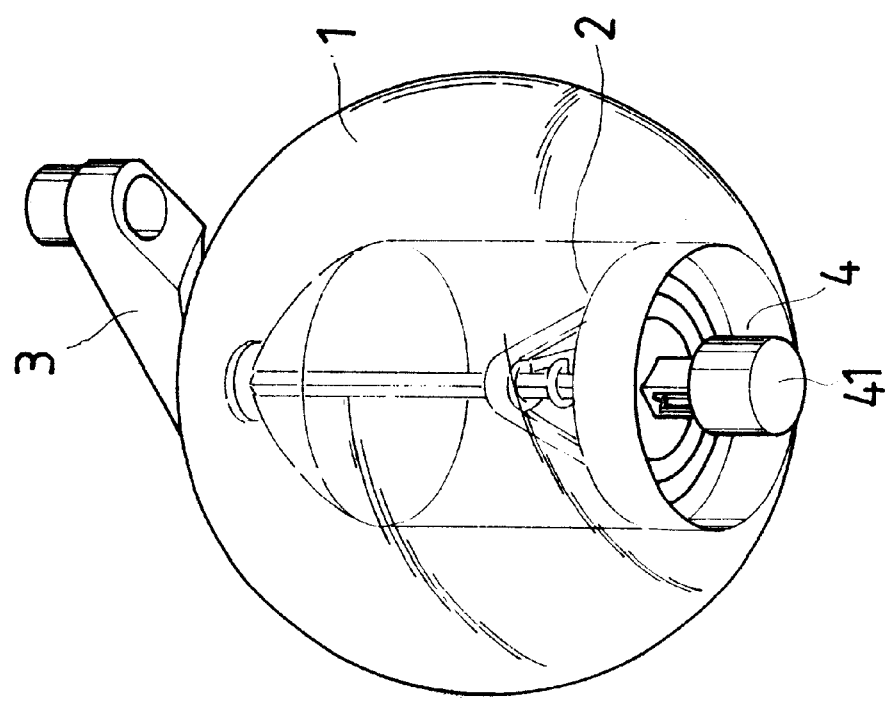
FIG. 8 is a perspective view of the second embodiment of the present invention, with the cap being located in the projecting adjustment position.
Figure 13:
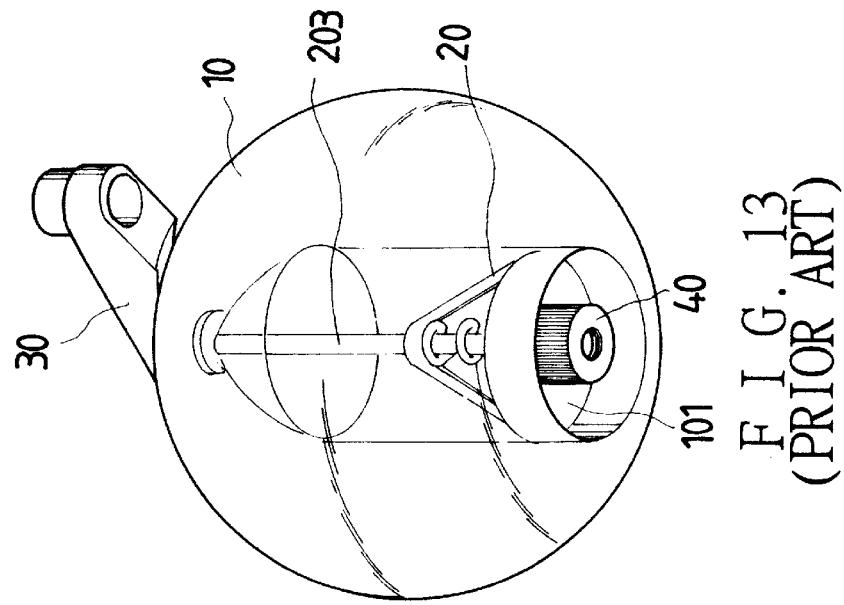
FIG. 13 is a perspective view of another prior art grinding tool.
Figure 11:
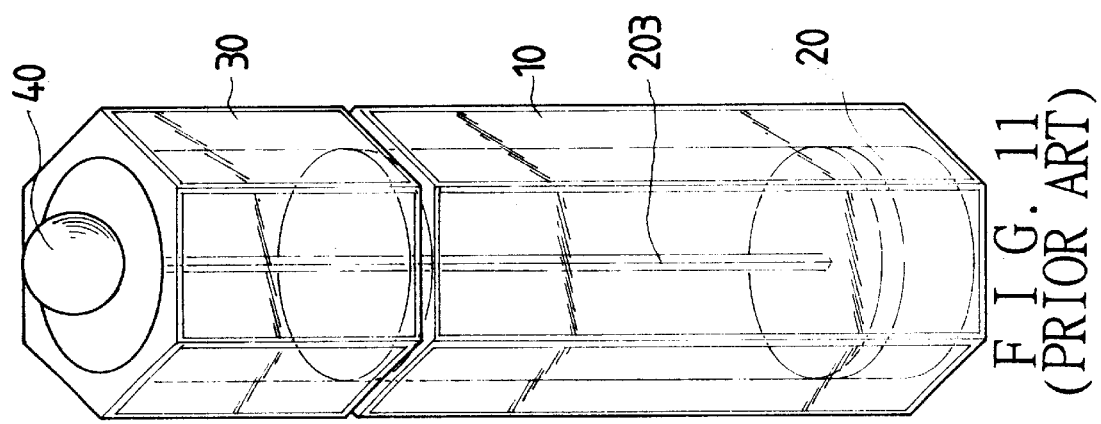
FIG. 11 is a view of a prior art pepper grinding tool.
Figure 14:
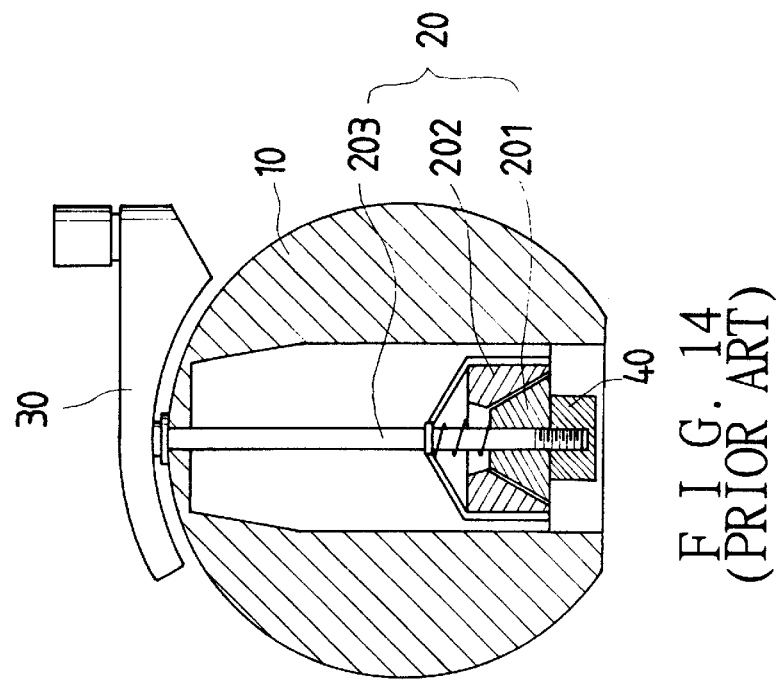
FIG. 14 is a cross-sectional view of the grinding tool in FIG. 13.
Figure 12:
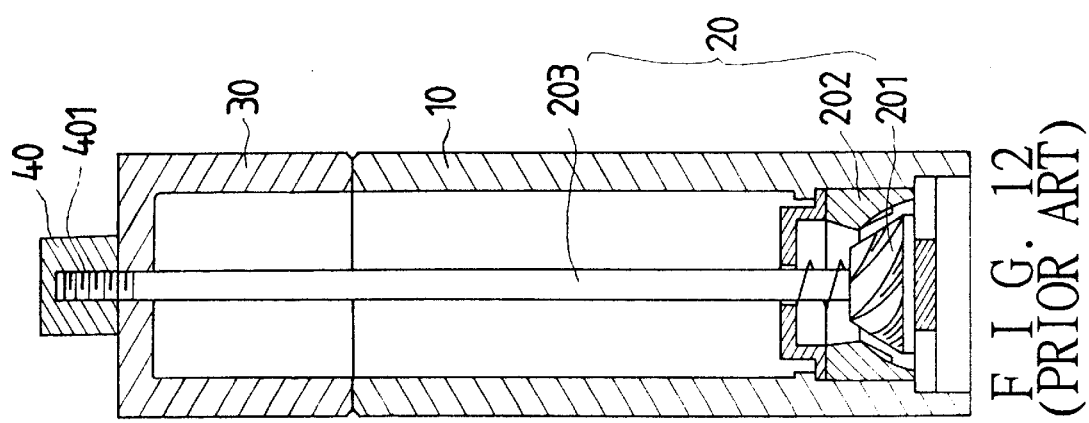
FIG. 12 is a cross-sectional view of the grinding tool in FIG. 11.

Referring to FIGS. 8, 9 and 10, in a second embodiment of the present invention, the adjustment member 4 is fitted to a bottom hole of the main body 1. The cap 41 of the adjustment member can be moved between an adjustment position and a hidden position. The movement is same as the first embodiment so it is not described again.

From the above description, the pepper grinding tool of the present invention can be known to have desirable features as follows.

1. When the pepper grinding tool doesn't need to be adjusted, the adjustment member can be hidden, and not stick out on the main body. So, the appearance of the pepper grinding tool cannot be affected in a bad way.
2. The adjustment member can be easily moved from the hidden position to a projecting adjustment position by depressing and releasing the cap.

What is claimed is:

1. An adjustment member of a pepper grinding tool comprising:
   (a) a cap, said cap being movably received within a hole formed through a main body of said grinding tool, said grinding tool having a grinding assembly received in said main body, said grinding assembly having an inner grinding wheel, an outer grinding wheel and a connecting rod, said grinding wheels having toothed portions facing each other for grinding pepper therebetween by turning said inner wheel relative to said outer wheel, said connecting rod being connected to said inner grinding wheel, said connecting rod having a threaded end portion;
   (b) an elastic member, said elastic member being received within said cap;
   (c) a support rod, said support rod having a threaded recess formed therein, said threaded end portion of said connecting rod being screwed into said threaded recess, said support rod being positioned beneath said elastic member and received within said cap for permitting said elastic member to bias said cap upwardly, said support rod having an engaging member formed thereon, an engaging recess being formed in said support rod about a periphery of said engaging member, said engaging member having an engaging lower end, said engaging recess having an engaging portion formed on an upper region thereof;
   (d) an engaging hook, said engaging hook having a connecting part and an engaging part, said connecting part being connected to said cap, said engaging part being movably received within said engaging recess of said support rod, whereby said cap can be moved between a hidden position and a projecting adjustment position, said hidden position having said cap depressed within said hole of said main body with said engaging part of said engaging hook engaging said engaging lower end of said engaging member, said projecting adjustment position having said cap being biased upwards by said elastic member and projecting from said hole, said engaging part being received within said engaging portion of said engaging recess, said cap being movable between said hidden position and said adjustment position through depression of said cap within said hole, said engaging hook holding said cap in place, said cap being rotated in order to rotate said connecting rod for adjusting a position of said inner wheel relative to said outer wheel.

\* \* \* \* \*